Jan. 4, 1966   S. A. FINDLEY   3,227,252
SEMI-AUTOMATIC GEAR SHIFT ASSEMBLY
Filed April 10, 1963   2 Sheets-Sheet 1
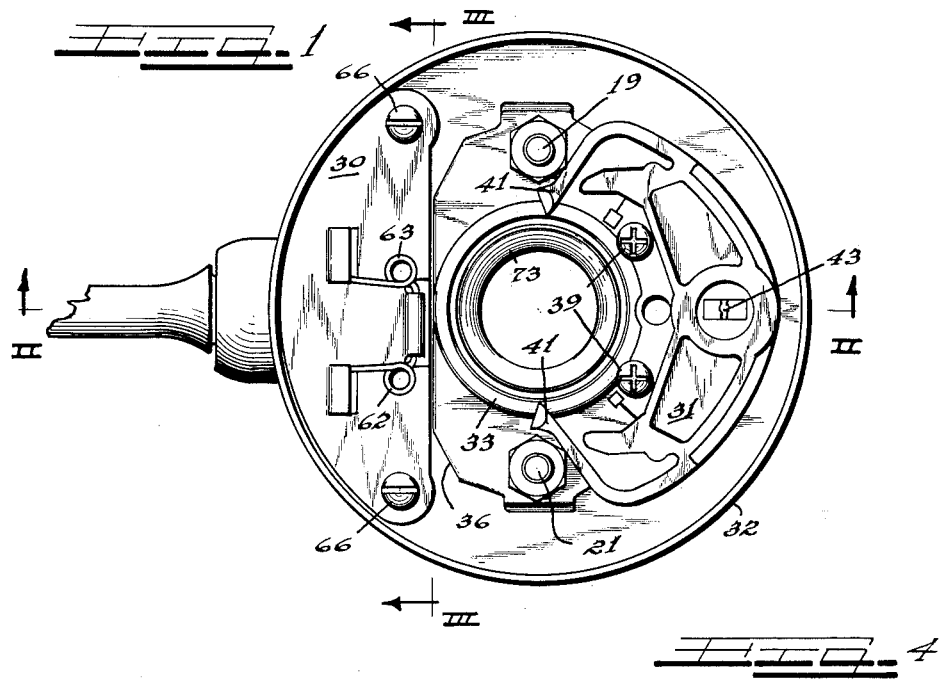
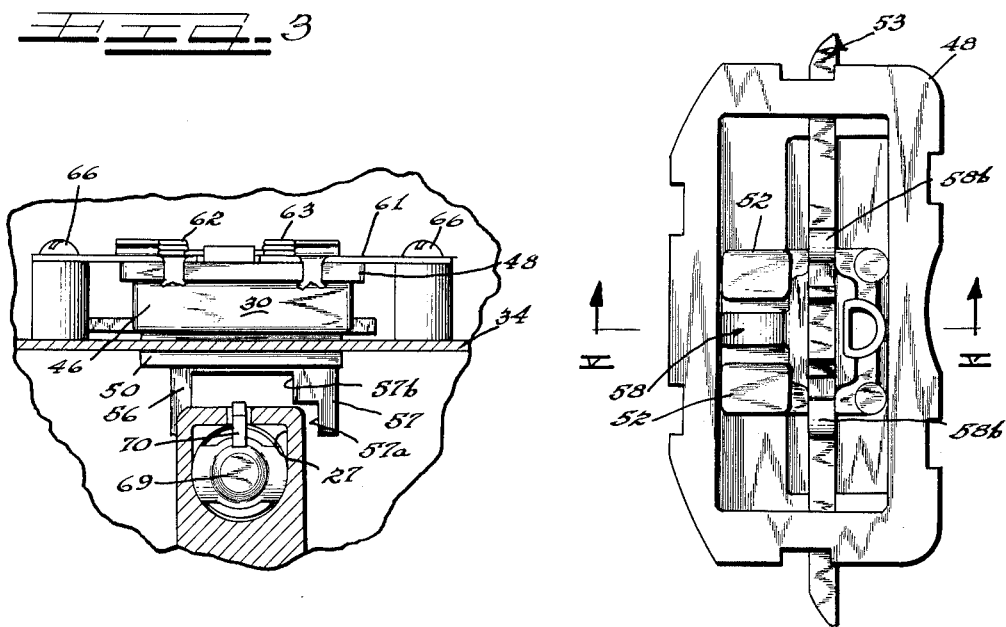
INVENTOR.
Samuel A. Findley
BY
ATTORNEYS

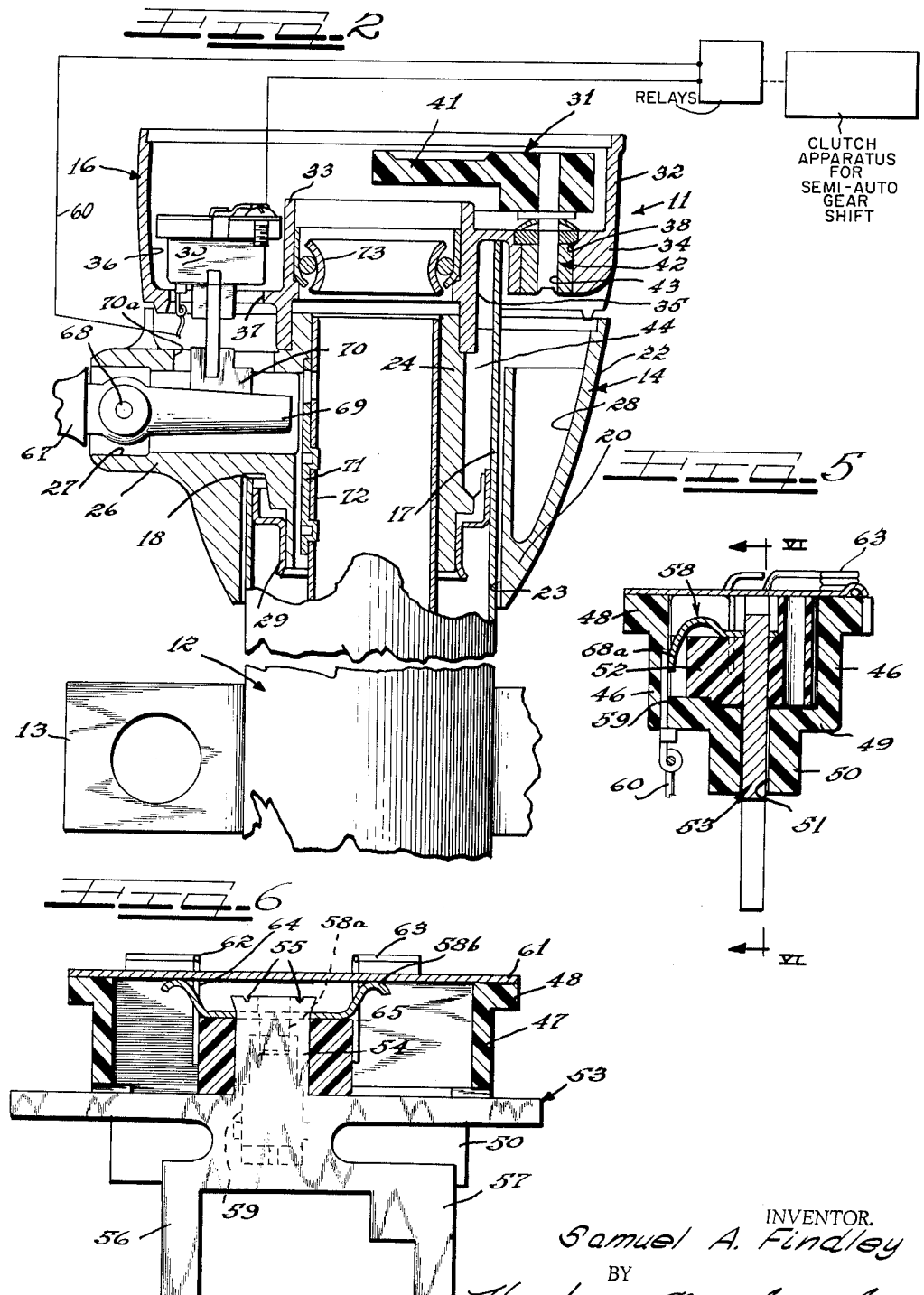

United States Patent Office 3,227,252
Patented Jan. 4, 1966

3,227,252
SEMI-AUTOMATIC GEAR SHIFT ASSEMBLY
Samuel A. Findley, Bronson, Mich., assignor to Kingston Products Corporation, Kokomo, Ind., a corporation of Indiana
Filed Apr. 10, 1963, Ser. No. 272,069
8 Claims. (Cl. 192—3.5)

This invention generally relates to an improved semi-automtic gear shift assembly wherein a grounding switch for controlling relays of an electrical control circuit is located directly in the housing of a steering column for actuation by the shift lever under the direction of the vehicle operator.

Semi-automatic gear shift assemblies heretofore provided have been bulky, complicated, expensive to manufacture, and expensive to repair in that they utilized a plurality of complicated precision cam arrangements in the steering post jacket connected to a gear shift lever to energize and deenergize a transmission clutch solenoid. These complicated precision cam arrangements were not only expensive but slight wear thereof caused the assembly to operate inefficiently. Also they required a specially designed steering post jacket in order for the cams to fit therein. Further, in order to repair this type of semi-automatic gear shift assembly it was necessary to disassemble the entire steering post jacket and remove the cam arrangements, a procedure which is both time consuming and expensive.

In accordance with the present invention, a sliding actuation grounding switch is located directly in the steering post casting and controls the operation of relays which, in turn, regulate the relays' control of the hydraulic pumps and other apparatus and to clutch and declutch the transmission.

It is therefore an object of the present invention to provide an improved semi-automatic gear shift system.

It is another object of the present invention to provide a semi-automatic gear shift system utilizing a switching assembly mounted in the top portion of a steering post jacket.

Other and further objects of this invention will be apparent to those skilled in the art from the following detailed description of the annexed sheets of drawings which by way of a preferred example only illustrate an embodiment of the present invention, and wherein like numerals refer to corresponding like parts.

On the drawings:

FIGURE 1 is a top partial plan view of the semi-automatic gear shift assembly of the present invention;

FIGURE 2 is a partial longitudinal cross-section with parts in elevation of the semi-automatic gear shift assembly taken along lines II—II of FIGURE 1;

FIGURE 3 is a partial transverse cross-section of the semi-automatic gear shift assembly of the present invention taken along lines III—III of FIGURE 1;

FIGURE 4 is a top plan view of the contact switch utilized in the semi-automatic gear shift assembly of the present invention having its cover removed;

FIGURE 5 is a transverse cross-sectional view of the contact switch of the present invention taken along lines V—V of FIGURE 4; and FIGURE 6 is a longitudinal cross-section of the contact switch taken along lines VI—VI of FIGURE 5.

As shown on the drawings:

Referring to FIGURES 1 and 2, there is illustrated a steering column 11 which is to be attached to an automobile steering post. The steering column comprises a generally tubular jacket 12 having a jacket bracket 13 used to connect the column 11 to the interior of the car. Surrounding the top portion of the steering jacket 12 is a casting or housing which may be referred to herein as a gear shift lever box 14. Fixedly connected to the steering jacket 12 above the lever box 14 is a turn signal housing 16. The lever box is movable relative to the signal housing 16 and the jacket 12.

The steering column jacket 12 is a cylindrical tubular column having a tubular wall 17 with a slot 18 formed in the upper end thereof which allows the gear shift lever box to be rotatably inserted therein. The wall 17 is also slotted near the top portion thereof to accommodate the affixation thereto the heads of upright extending bolts 19 and 21.

The gear lever box 14 fits over the top of the jacket 12 and comprises an outer wall 22 frusto-ogive shape joined as at 20 to an inner cylindrical wall 23 slightly spaced from the outer surface of the jacket wall 17 to allow rotation relative to the jacket wall 17, and a tubular inner wall 24 concentric with the jacket wall 17. The inner wall 24 is within the tubular wall 17 and radially spaced from the inner surfaces thereof.

The gear shift lever box inner wall 24 has a hollow integral protrusion 26 which extends beyond the outer wall 22 and is integral therewith and has a gear lever extension passageway 27 extending therethrough. Therefore, the relative rotation of the gear lever box 14 to the stationary jacket 12 is limited by the portion of the protrusion connecting the inner wall 24 with the outer wall 22 and the sides of the jacket slot 18.

The gear lever box outer wall 20 is preferably of a lightweight construction and therefore has hollow portions such as a chamber 28. The lever box is pivotally mounted to the inside of the jacket wall 17 by suitable cylindrical pivot bearing and retaining means 29.

The turn signal housing 16 houses a turn signal switch 31 and has cylindrical side walls 32, a concentric tubular central wall 33, and a base 34. The base 34 has a circumferential slot 35 formed in bottom outer portion thereof to attach the top of the jacket wall 17 to the bottom wall by bolts 19 and 21. The bottom portion of the central wall 33 sits pivotally on the outer circumference of the protrusion 24 to allow the lever box to pivot relative to the turn signal housing 16.

The turn signal switch 31 is connected to the base wall 34 by screws 39, and has a pair of steering wheel responsive arms 41 that are in a normal non-electrical contact position, as illustrated in FIGURE 1. The arms are fixedly connected to pivot means 42 pivotally mounted in a passage 38. The pivot means has a passage 43 that passes through the entire switch and keys the turn signal lever to the switch to allow the lever to pivot the arms 41 and to make electrical contact.

Adjacent the passageway 38 is a wire passageway through the base wall 34 to allow the turn signal wires and other wires i.e. for horns to pass therethrough. All the electrical wires are grouped together and pass through a port in the upper portion of the jacket wall 17 through a wire housing 44 formed on the inner surface of the jacket wall 17. The wires are led to a port in the lower portion of the jacket wall 17 where they exit from the housing 44 and are then ready to be connected to their respective control means.

In accordance with the principles of the present invention, a clutch operating switch is housed within the turn signal housing. To effect that objective, the turn signal housing base 34 has a grooved-out portion 36 on the inner portion thereof to seat the clutch solenoid switch 30. The grooved portion 36 has a passageway 37 passing through the bottom thereof.

Referring to FIGURES 3 through 6 the contact switch 30 has a rectangular housing having side walls 46, end walls 47, a flange 48 extending from the side and end walls, and a bottom wall 49. The bottom wall 49 has an integral rectangular protrusion 50 extending from the bottom side thereof. A longitudinal passageway 51 is formed through the protrusion and bottom wall and extends the length thereof. Slidably mounted within the housing is a slidable switch body 52 having a rectangular actuating member 53 attached thereto and passing through the passageway 51. The actuator 53 has an upright neck portion 54 being attached to the switch body by slots 55 made in the top portion thereof and has a downwardly extending rectangular leg 56 and a downwardly extending rectangular stepped leg 57 that protrude beyond the bottom of the protrusion 50.

A first electrical contact member 58 is attached to the top of the sliding body member and has a contact portion 58a extending down along the sides thereof. The ground portion 58b extends over the top thereof. The contact member 58 is so arranged that it makes contact with a second electrical contact 59 when the body member is centrally located in the switch housing. The second contact 59 is mounted to the side wall 46 with suitable wires 60 extending therefrom to a clutch solenoid circuit. When the first and second electrical contacts are in contact position, an electrical circuit is completed and the clutch solenoid is energized to engage the clutch of a power operated clutch mechanism.

The clutch solenoid switch housing is enclosed by an oversized cover 61 attached thereto. A pair of coil springs 62 and 63 are attached to the top of the cover and have respective spring arms 64 and 65 protruding through the cover and contacting opposite sides of the body member 52. The spring arms are arranged to urge the body member in a central position where the first and second electrical contacts are in electrical contact.

The entire clutch solenoid switch is attached to the base of the signal housing by screws 66. The switch 30 is so attached that the switch protrusion 50 and electrical actuator legs 56 and 57 protrude through the slot 37 which is sized to permit movement of the actuator legs 56 and 57 therein.

A shift lever 67 is attached to lever protrusion portion 26 by suitable attaching means 68 and has a lever extension portion 69 with a rectangular stepped contact means 70 extending upwardly therefrom through a slot 70a provided in the top of the gear box 14. The lever contact means is so positioned that it extends between the actuator arms 56 and 57. The end of the lever contact means is suitably attached to a member 71 which is keyed to a cylindrical lever 72. The member 71 and cylindrical lever are mounted to the lever box wall 24 in such a manner that they corotate with the wall 24 but may move longitudinally relative thereto. The lever arm 72 is properly connected to the transmission of the automobile to translate the motion of the shift to engage the proper transmission gears.

The signal housing has suitably attached to the inner surface of its central portion 33, a steering post bearing and centering means 73. The centering means 73 centers a steering post (not shown) which passes through the steering column and aids in maintaining the steering post away from any unnecessary friction contact with the steering column. The steering column 11 is placed on the steering post and attached to the dashboard by suitable attaching means connecting the column jacket bracket 13 to the interior of the car. A suitable steering wheel is attached to the steering post over the signal housing 16.

In operation, the gear shift extension contact portion 70 is in non-contact position between the switch legs 56 and 57 as is illustrated in FIGURE 3 when the transmission and the actuator are in neutral. The clutch solenoid switch electrical contacts 58 and 59 are in electrical contact to energize the clutch solenoid circuit and engage the transmission clutch to place the transmission in a neutral non-mesh gear position.

When the shift lever is placed in first gear position, the contact 70 contacts the actuator lower portion 57a of actuator leg 57 and the switch body member is moved to the right so that the contacts 58 and 59 are temporarily out of electrical contact. Thus the clutch solenoid electrical circuit is broken and the clutch solenoid temporarily deenergized to disengage the transmission clutch.

As the lever is shifted into second gear, the actuator 52 moves to the left and first allows the contacts 58 and 59 to once again make electrical contact to engage the clutch and secondly the lever contact 70 contacts the actuator leg 56. The lever contact 70 moves said actuator 52 further to the left to mesh the electrical contact between the contacts 58 and 59 to disengage the clutch.

When finally shifting into high or third gear, the above sequence of steps is repeated. However, when in third gear the lever contact 70 engages the upper portion 57b of the actuator leg 57. The space between actuator legs 56 and 57 and the size of the contacts 58 and 59 are such that the clutch will be disengaged after the transmission is in its selected gear and the clutch will be engaged before the transmission is removed from its selected gear upon slight movement of the shift lever. When the contacts 58 and 59 are not in contact, they are only separated by a fraction of an inch. This arrangement substantially eliminates unnecessary wear of the transmission gears.

The transmission of the automobile may also be equipped with means to automatically shift the automobile into its proper gear, for example, by coupling the clutch solenoid with a fluid actuator. The fluid actuator shifts the car according to the r.p.m. and the m.p.h. of the automobile. When the automobile reaches a certain speed and the r.p.m. a certain level, the clutch solenoid is energized and the automobile is shifted into another gear. When such a fluid drive transmission is coupled with the semi-automatic gear shift assembly of the present invention, it is set so that it will shift to a higher gear at a speed slightly higher than the speed it would be normally set and it will downshift at a speed slightly lower than the normal downshift speed. This coupling arrangement prevents the fluid drive from interfering with the manual shifting operation.

It is therefore seen that I have provided an improved semi-automatic gear shift assembly wherein the grounding switch is located directly in the steering post casting and may thus be inexpensively manufactured and repaired. Further, my gear shift assembly may be easily adapted to present steering columns and provides an effective semi-automatic means while maintaining the esthetic values of manual shifting.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A semi-automatic gear shift assembly comprising:
    a steering column,
    a turn signal housing on the upper end of said steering column,
    a rotatable shift lever housing mounted on said steering column adjacent to and below said turn signal housing in an area accessible to an operator,
    a turn signal switch in said turn signal housing for controlling a directional turn signal circuit,
    a gear shift lever connected to said shift lever housing,
    and a clutch operating grounding switch located directly in said turn signal housing,
    said gear shift lever being operatively connected to said grounding switch to control relays of an electrical gear shift control circuit, whereby the operator controls the grounding switch by manipulation of the gear shift lever.

2. In combination, a gear shift assembly, and an automobile clutch system including a clutch and having a clutch solenoid to operate said clutch system, said gear shift assembly comprising:
   a steering column,
   adjacent housings for a turn signal and a gear shift on the top end portion of said column,
   a shift lever connected to said gear shift housing,
   and a clutch operating contact switch in said turn signal housing operatively connected to the clutch solenoid to engage said clutch when in electrical contact and to disengage said clutch when not in electrical contact,
   and means on said shift lever connected to said contact switch to make and break the electrical contact of said switch,
whereby said switch will energize said clutch solenoid when electrical contact is made to engage the clutch and will de-energize said clutch solenoid when said electrical contact is broken to disengage said clutch.

3. In combination, an automobile clutch system including a clutch and having a clutch solenoid to operate said clutch system, and a semi-automatic gear shift assembly comprising:
   a steering column having adjacent housings for a turn signal and a gear shift, respectively
   a shift lever connected to said gear shift housing,
   a self-centering contact switch in said turn signal housing and operatively connected to the clutch solenoid to engage said clutch when in electrical contact and to disengage said clutch when not in electrical contact,
   said contact switch having a first movable electrical contact and a second stationary electrical contact,
   means connected to said switch to constantly urge said first movable contact in electrical contact with said second stationary contact,
   means connected to said shift lever to separate the first and second contacts to break the electrical contact of said switch
whereby said switch will energize said clutch solenoid when electrical contact is made to engage the clutch and will de-energize said clutch solenoid when said electrical contact is broken to disengage said clutch.

4. An assembly as defined in claim 3 further characterized by a pair of spaced actuator legs on said first movable contact,
   actuator positioner means extending from one end of said shift lever to between said spaced actuator legs,
   said actuator positioner moving with said shift lever to move said first movable contact to break the electrical contact of said switch
whereby said switch will energize said clutch solenoid when electrical contact is made to engage the clutch and will de-energize said clutch solenoid when said electrical contact is broken to disengage said clutch.

5. A semi-automatic gear shift assembly for an automobile having a clutch assembly operated by a clutch solenoid comprising:
   a steering column having
      a steering column jacket,
      a signal housing fixedly secured to said steering column jacket, and
      a gear lever box pivotally connected to said steering column below said signal housing and being rotatably a predetermined amount relative to said column jacket and said signal housing,
   a self-centering clutch solenoid contact switch mounted in said signal housing,
   said solenoid switch having
      a switch housing with side walls, end walls, a bottom wall, and a passageway formed through the bottom wall,
      a first contact member slidably mounted in said housing,
      a second electrical contact mounted in the housing and having its contact surface facing the the contact surface of the first electrical contact member to make electrical contact therewith, and
      a self-centering means connected to said first movable contact to constantly urge said first contact in electrical contact with said second stationary contact,
   a gear shift lever being connected to the steering column lever box to shift automobile transmission gears,
   said gear shift lever having a actuator positioner connected thereto, and
   said actuator positioner being connected to the gear lever and the first movable contact to move the first movable contact out of contact with the second stationary contact and break the electrical contact of the clutch solenoid switch
whereby said switch will energize said clutch solenoid when electrical contact is made to engage the clutch and will de-energize said clutch solenoid when said electrical contact is broken to disengage said clutch.

6. A semi-automatic gear shift assembly for an automobile having a clutch assembly operated by a clutch solenoid comprising:
   a steering column having
      a steering column jacket,
      a signal housing fixedly secured to said steering column jacket, and
      a gear lever box pivotally connected to said steering column below said signal housing and being rotatable a predetermined amount relative to said column jacket and said signal housing,
   a self-centering clutch solenoid contact switch mounted in said signal housing,
   said solenoid switch having
      a switch housing with side walls, end walls, a bottom wall, and a passageway formed through the bottom wall,
      a switch body member slidably mounted in said housing to slide along the length of the inner base wall,
      a predetermined shaped rectangular actuator member fixedly secured to said body member,
      said actuator member being slidable in said passageway and having two spaced actuator legs extending below said protrusion,
      a first electrical contact connected to the body member and having an electrical contact portion extending down along the side thereof with its contact surface facing one of the switch housing side walls,
      a second electrical contact mounted in the one side wall of the switch housing and having its contact surface facing the contact surface of the first electrical contact member to make electrical contact therewith,
      self-centering means connected to said body member to constantly urge said first contact in electrical contact with said second contact,
   a gear shift lever being mounted on said steering column and the lever box to rotate said lever box,
   said gear shift lever having a contact member extending upwardly therefrom towards the signal housing,
   said solenoid switch being mounted in said signal housing so that the actuator extends through the bottom thereof,
   said gear shift lever being mounted to the gear box so that the lever contact member extends between the actuator legs and is spaced therefrom when in a neutral gear position, said clutch solenoid switch being connected to the clutch solenoid to energize the clutch solenoid when the first and second contacts are in electrical contact, the distance between said actuator legs, the size of said lever contact member, the size of the second electrical contact surface, and the size of the first electrical contact surface are predetermined so that
    the lever contact member engages one of the actuator legs when said lever is moved to a preselected gear position, and said first contact surface is separated from said second contact surface to de-energize the clutch solenoid after the lever is in its preselected gear position and slight movement of the lever out of the preselected gear position will bring the first and second contact member into electrical contact to energize said clutch solenoid before the lever is taken out of its preselected gear position.

7. A semi-automatic gear shift assembly for an automobile having a clutch assembly operated by a clutch solenoid comprising:
    a steering column having
        a steering column jacket,
        a signal housing fixedly secured to said steering column jacket, and
        a gear lever box pivotally connected to said steering column below said signal housing and being rotatable a predetermined amount relative to said column jacket and said signal housing,
    a signal switch mounted in said signal housing to control signal lights on an automobile,
    a self-centering clutch solenoid contact switch mounted in said signal housing opposite said signal switch,
    said solenoid switch having
        a switch housing with side walls, end walls, a bottom wall, and a passageway formed through the bottom wall,
        a switch body member slidably mounted in said housing to slide along the length of the inner base wall,
        a predetermined shaped rectangular actuator member fixedly secured to said body member,
        said actuator member being slidably in said passageway and having two spaced actuator legs extending below said protrusion,
        a first electrical contact connected to the body member and having an electrical contact portion extending down along the side thereof with its contact surface facing one of the switch housing side walls and a ground portion extending over the top of the body member,
        a second electrical contact mounted approximately in the center of the one side wall of the switch housing and having its contact surface facing the contact surface of the first electrical contact member to make electrical contact therewith,
        a metal switch housing cover covering said switch housing and the inner surface thereof being in contact with the ground portion of said first electrical contact member,
        self-centering means connected to said body member to constantly urge said first contact in electrical contact with said second contact,
    a gear shift lever being mounted on said steering column and the lever box to rotate said lever box,
    said gear shift lever having an extension portion with a contact member extending upwardly therefrom towards the signal housing,
    said solenoid switch being mounted in said signal housing so that the actuator extends through the bottom thereof, said gear shift lever being mounted to the gear box so that the lever contact member extends between the actuator legs and is spaced therefrom when in a neutral gear position, said clutch solenoid switch being connected to the clutch solenoid to energize the clutch solenoid when the first and second contacts are in electrical contact, the distance between said actuator legs, the size of said lever contact member, the size of the second electrical contact surface, and the size of the first electrical contact surface being predetermined to have
    the lever contact member engage one of the actuator legs when said lever is moved to a selected gear position, and
    said first contact surface is separated from said second contact surface to de-energize the clutch solenoid after the lever is in its selected gear position and the first and second contacts are in electrical contact to energize said clutch solenoid before the lever is taken out of its selected gear position.

8. A semi-automatic gear shift assembly for an automobile having a clutch assembly operated by a clutch solenoid comprising:
    a steering column having
        a steering column jacket,
        a signal housing fixedly secured to said steering column jacket, and
        a gear lever box pivotally connected to said steering column below said signal housing and being rotatable a predetermined amount relative to said column jacket and said signal housing,
    a signal switch mounted in said signal housing to control signal lights on an automobile,
    a self-centering clutch solenoid contact switch mounted in said signal housing opposite said signal switch,
    said solenoid switch having
        a switch housing with side walls, end walls, a bottom wall, a protrusion extending downwardly from said bottom wall along the length thereof, and a passageway extending lengthwise through the protrusion and the bottom wall,
        a switch body member in said housing slidably mounted on said inner base wall,
        a predetermined shaped rectangular actuator member fixedly secured to said body member, said actuator member being slidable in said passageway and having two spaced actuator legs extending below said protrusion,
        a first electrical contact connected to the body member and having an electrical contact portion extending down along the side thereof with its contact surface facing one of the switch housing side walls and a ground portion extending over the top of the body member,
        a second electrical contact mounted approximately in the center of the one side wall of the switch housing and having its contact surface facing the contact surface of the first electrical contact member to make electrical contact therewith,
        a switch housing cover made of electrically conductive material covering said switch housing and having its inner surface in contact with the ground portion of said first electrical contact member,
        a pair of springs connected to the top of said cover and having spring legs extending into the switch housing to engage each end of said switch body member, and said spring legs continuously biasing said body member to the center of said switch housing to have said first and second contacts in electrical contact, a gear shift lever being mounted on said steering column and said lever box to rotate said lever box, said gear shift lever having an extension portion with a stepped contact member extending upwardly therefrom towards the signal housing, said solenoid switch being mounted in said signal housing so that the actuator extends through the bottom thereof, said gear shift lever being mounted to the gear box so that the lever contact member extends between the actuator legs and is spaced therefrom when in a neutral gear position, said clutch solenoid switch being connected to the clutch solenoid to energize the clutch solenoid when the first and second contacts are in electrical contact, the distance between said actuator legs, the size of said lever contact member, the size of the second electrical contact surface, and the size of the first electrical contact surface being predetermined to have the lever contact member engage the one actuator leg lower contact surface when said lever is moved to a first low gear position, the lever contact member engage the one actuator leg upper contact surface when said lever is moved to a third high gear position, and engage the other actuator leg contact surface when the lever is moved to a second intermediate gear position and a reverse gear position, and said first contact surface is separated from said second contact surface to de-energize the clutch solenoid after the lever is in its selected gear position and the first and second contacts are in electrical contact to energize said clutch solenoid before the lever is taken out of its selected gear position.

References Cited by the Examiner

UNITED STATES PATENTS

| 2,342,138 | 2/1944 | Gilfillan | 74—473 |
| 2,360,496 | 10/1944 | Hill | 192—3.5 X |
| 2,536,462 | 1/1951 | Price. | |
| 2,760,382 | 8/1956 | Bliss | 74—492 |
| 2,800,208 | 7/1957 | Binder | 192—3.5 |

FOREIGN PATENTS

| 1,206,696 | 2/1960 | France. |
| 799,156 | 8/1958 | Great Britain. |

DON A. WAITE, *Primary Examiner.*

DAVID J. WILLIAMOWSKY, *Examiner.*